A. LANE.
Improvement in Corn Husking and Shelling Machines.
No. 124,068. Patented Feb. 27, 1872.

UNITED STATES PATENT OFFICE.

ALEXANDER LANE, OF MOSCOW, KENTUCKY.

IMPROVEMENT IN CORN-HUSKING AND SHELLING MACHINES.

Specification forming part of Letters Patent No. 124,068, dated February 27, 1872.

*To all whom it may concern:*

Be it known that I, ALEXANDER LANE, of Moscow, in the county of Hickman and State of Kentucky, have invented a new and Improved Corn-Husker and Sheller; and I do hereby declare that the following is a full, clear, and exact description thereof, which will enable others skilled in the art to make and use the same, reference being had to the accompanying drawing forming part of this specification.

The invention will first be fully described and then clearly pointed out in the claim.

Figure 1:
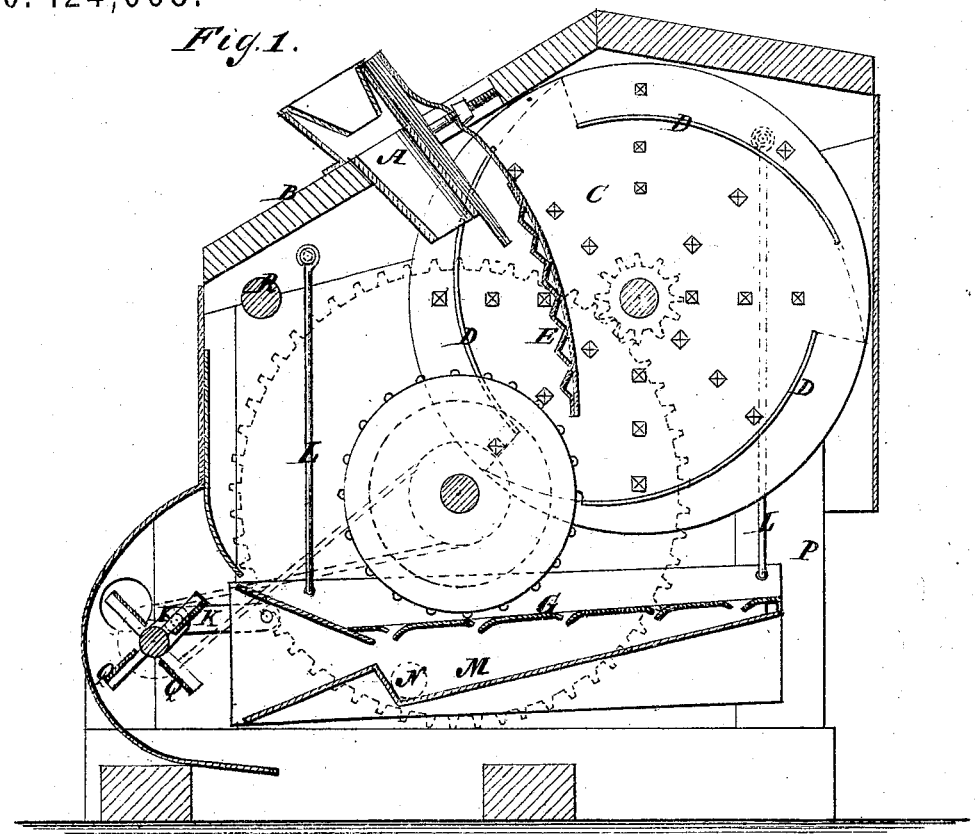
Figure 2:
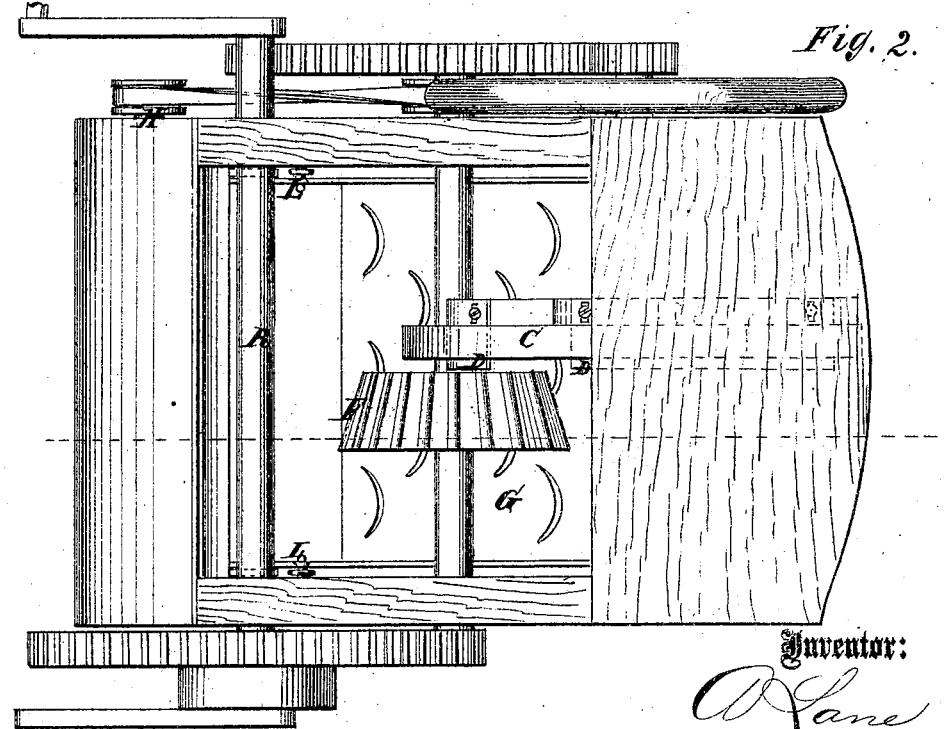

Figure 1 is a sectional elevation of my improved machine, and Fig. 2 is a top view with the cover and spout removed.

Similar letters of reference indicate corresponding parts.

A is a feeding-spout, suitable for introducing the ears of corn with the husks on, through the case B to the interior, so as to hang down by the side of the rotating disk C, carrying knives D for pulling or cutting off the husks, the ears being prevented from falling from the spout beyond the disk by the roughened or notched spring E hanging down in front of and below the end of the spout, and by the side of disk C, so as to receive the ends of the ears and cramp them across the end of the spout, and press them against the end of the disk to some extent, until they are forced from the spout by those thrust in behind them by the attendant. The said guard also holds the ears against the face of the shelling-wheel F after the husks are removed, and this wheel removes the grain from the cob, being assisted somewhat, by the disk C, and the knives thereon, against which the ear is caused to bear to some extent, by the oblique face of wheel F, which descends toward it. The shelled grain, husks, and cobs, fall upon the screen G, which is shaken by the fan-shaft H, crank I, and connecting-rod K, the said screen being suspended on rods L, so that it may swing to and fro. The grain falls through the screen into the cavity M, and escapes through the spout N, while the chaff, cobs, &c., are blown out through the passage P by the fan.

All the rotating parts are driven from the crank-shaft R, by suitable multiplying gear, according to the speed required for each part, the disk C being driven at a rapid rate while the other parts move more slowly.

I propose to have three or more sets of these husking and shelling wheels, and the spouts and guards therefor, in one case, to be driven by one set of gear, which may be readily done, as clearly indicated.

Having thus described my invention, I claim as new and desire to secure by Letters Patent—

The oblique-faced sheller-disk F, when combined with a husker and sheller C D, and a spring ear-holder E, constructed and arranged as described, and for the purpose set forth.

ALEXANDER LANE.

Witnesses:
  J. C. OATES,
  A. H. McLEOD.